United States Patent
Amit et al.

(10) Patent No.: US 9,699,284 B2
(45) Date of Patent: Jul. 4, 2017

(54) DIRECTORY CONTACT IMAGE SIZE BASED ON SOCIAL INTERACTION

(71) Applicant: COMVERSE, LTD, Raanana (IL)

(72) Inventors: Noga Amit, Beer Yaacov (IL); Amit Braytenbaum, Lehavim (IL); Omer Uretzky, Ramat Hasharon (IL); Daniel Grouzberg, Petach Tikva (IL)

(73) Assignee: MAVENIR LTD. (IL)

( * ) Notice: Subject to any disclaimer, the term of this patent is extended or adjusted under 35 U.S.C. 154(b) by 0 days.

(21) Appl. No.: 15/214,991

(22) Filed: Jul. 20, 2016

(65) Prior Publication Data

US 2016/0330305 A1    Nov. 10, 2016

Related U.S. Application Data

(63) Continuation of application No. PCT/US2015/013657, filed on Jan. 30, 2015.

(60) Provisional application No. 61/933,593, filed on Jan. 30, 2014.

(51) Int. Cl.
*H04M 1/2745*    (2006.01)

(52) U.S. Cl.
CPC . *H04M 1/274583* (2013.01); *H04M 1/27455* (2013.01); *H04M 2250/60* (2013.01)

(58) Field of Classification Search
CPC ............................................. H04M 1/274583
See application file for complete search history.

(56) References Cited

U.S. PATENT DOCUMENTS

2004/0017376 A1* 1/2004 Tagliabue ....... H04M 1/274583
345/581
2011/0276895 A1* 11/2011 van der Flier ........ G06F 3/0481
715/751

FOREIGN PATENT DOCUMENTS

WO    02082343 A1    10/2002

OTHER PUBLICATIONS

International Search Report dated Apr. 24, 2015 from PCT/US2015/013657, 3 pages.
Written Opinion dated Apr. 24, 2015 from PCT/US2015/013657, 4 pages.
International Preliminary Report on Patentability (IPRP) dated Feb. 12, 2106 from PCT/US2015/013657, pp. 8.

* cited by examiner

*Primary Examiner* — Tuan H Nguyen
(74) *Attorney, Agent, or Firm* — Ohlandt, Greeley, Ruggiero & Perle, L.L.P.

(57) ABSTRACT

There is presented a method that includes (a) receiving, from a server, data that indicates an intensity of interactions between a user and each of a first contact of the user and a second contact of the user, where the interactions include (i) communications conducted by way of a first device of the user, and (ii) communications conducted by way of a second device of the user, (b) calculating a first score for the first contact and a second score for the second contact, based on the intensity of interactions, (c) determining a first size for a first image that represents the first contact based on the first score, and a second size for a second image that represents the second contact based on the second score, and (d) presenting on a display, the first image having the first size and the second image having the second size.

15 Claims, 6 Drawing Sheets

DIRECTORY CONTACT IMAGE SIZE BASED ON SOCIAL INTERACTION

BACKGROUND OF THE DISCLOSURE

1. Field of the Disclosure

The present disclosure relates to presentation of information on a display of a user device, and more particularly, to a presentation of contacts having sizes that are based on relative interactions between a user and the contacts.

2. Description of the Related Art

A user of a device such as a mobile telephone or a computer tablet will typically have a plurality of contacts with whom the user communicates. Ordinarily, some of the contacts are of more importance to the user than are other contacts. The present disclosure concerns the manner in which the contacts are presented on a display of the device.

SUMMARY OF THE DISCLOSURE

There is presented a method that includes (a) receiving, from a server, data that indicates an intensity of interactions between a user and each of a first contact of the user and a second contact of the user, where the interactions include (i) communications conducted by way of a first device of the user, and (ii) communications conducted by way of a second device of the user, (b) calculating a first score for the first contact and a second score for the second contact, based on the intensity of interactions, (c) determining a first size for a first image that represents the first contact based on the first score, and a second size for a second image that represents the second contact based on the second score, and (d) presenting on a display, the first image having the first size and the second image having the second size. There is also presented an apparatus that performs the method, and a storage device that contains instructions that cause a processor to perform the method.

BRIEF DESCRIPTION OF THE DRAWINGS

A component or a feature that is common to more than one drawing is indicated with the same reference number in each of the drawings.

DESCRIPTION OF THE DISCLOSURE

A technical challenge addressed by the present disclosure is to develop a multi-channel communication application that focuses on conversation functions and visualization. In order to reach this goal, a display of contacts supports three levels of hierarchy: (1) by recent interaction with contacts, represented by order of contacts, (2) by an interaction intensity score, represented by contact view size, and (3) by contact presence, represented, for example, by a photo of the contact. A technical problem in addressing this challenge includes two main factors, namely (1) contacts' size visualization, and (2) contacts' size calculation.

Figure 1:
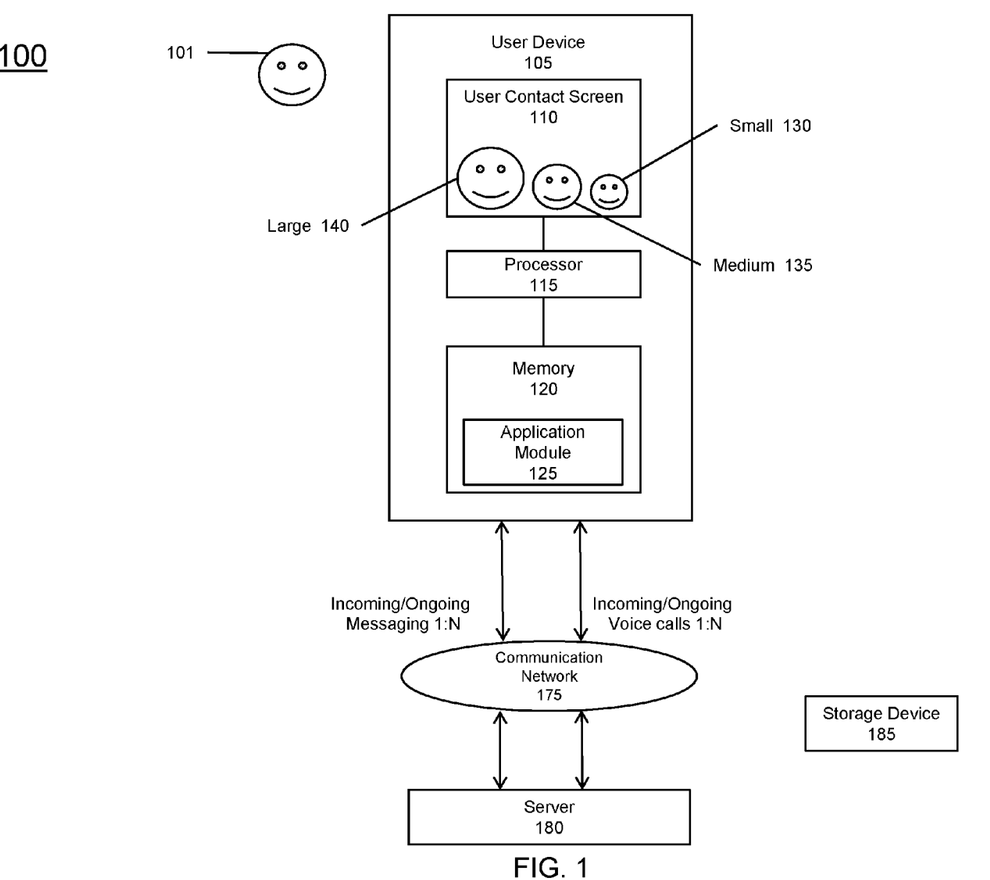
FIG. 1 is a block diagram of a system for presenting, on a display of a user device, contacts having sizes that are based on relative interactions between a user and the contacts.

FIG. 1 is a block diagram of a system 100 for presenting, on a display of a user device, contacts having sizes that are based on relative interactions between a user and the contacts. System 100 includes a user device 105 and a server 180 that are communicatively coupled to one another via a communication network 175. A user 101 operates user device 105.

Communication network 175 is a data communications network. Communication network 175 may be a private network or a public network, and may include any or all of (a) a personal area network, e.g., covering a room, (b) a local area network, e.g., covering a building, (c) a campus area network, e.g., covering a campus, (d) a metropolitan area network, e.g., covering a city, (e) a wide area network, e.g., covering an area that links across metropolitan, regional, or national boundaries, or (f) the Internet. Communications are conducted via communication network 175 by way of electronic signals and optical signals.

User device 105 includes a user contact screen 110, i.e., a display, a processor 115 and a memory 120.

User contact screen 110 is a touch-sensitive screen that displays information to user 101 and allows user 101 to manipulate a cursor thereon for communicating information and command selections to processor 115. User device 105 may also include (a) an input device, such as a keyboard or speech recognition subsystem, for enabling user 101 to communicate additional information and command selections to processor 115, and (b) a speech synthesizer that provides information to user 101 in audio form.

Processor 115 is an electronic device configured of logic circuitry that responds to and executes instructions.

Memory 120 is a tangible computer-readable storage device encoded with a computer program. In this regard, memory 120 stores data and instructions, i.e., program code, that are readable and executable by processor 115 for controlling the operation of processor 115. Memory 120 may be implemented in a random access memory (RAM), a hard drive, a read only memory (ROM), or a combination thereof. One of the components of memory 120 is an application module 125.

Application module 125 contains instructions for controlling processor 115 to execute operations described herein. For example, under control of application module 125, processor 115 enables user 101 to use application module 125 to communicate with contacts, i.e., people and groups, who are listed in a contact list (not shown). In the present document, although we describe operations being performed by user device 105, or by application module 125 or its subordinate modules, the operations are actually being performed by processor 115.

The term "module" is used herein to denote a functional operation that may be embodied either as a stand-alone component or as an integrated configuration of a plurality of subordinate components. Thus, application module 125 may be implemented as a single module or as a plurality of modules that operate in cooperation with one another. Moreover, although application module 125 is described herein as being installed in memory 120, and therefore being implemented in software, it could be implemented in any of hardware (e.g., electronic circuitry), firmware, software, or a combination thereof.

While application module 125 is indicated as being already loaded into memory 120, it may be configured on a storage device 185 for subsequent loading into memory 120. Storage device 185 is a tangible computer-readable storage device that stores application module 125 thereon. Examples of storage device 185 include a compact disk, a magnetic tape, a read only memory, an optical storage medium, a hard drive or a memory unit consisting of multiple parallel hard drives, and a universal serial bus (USB) flash drive. Alternatively, storage device 185 can be a random access memory, or other type of electronic storage device, located on a remote storage system and coupled to user device 105 via communication network 175.

As mentioned above, user 101 communicates with contacts that are listed in a contact list. Server 180 calculates parameters that reflect an intensity of interactions between user 101 and the contacts, based on a frequency and/or quantity of interactions in various communication channels. Such interactions can include, but are not limited to, a number of voice calls, a length of a voice call, a number of text messages, a total minutes of one-on-one (1-1) voice calls, a total minutes of conference voice calls, a total number of messages in 1-1 chats, a total number of messages in group chats. Thereafter, server 180 returns these parameters to application module 125 over communication network 175.

Application module 125 calculates a score for each contact and determines a contact view size for each contact. In addition application module 125 fetches, from memory 120, contact list details for the contacts, calculates the score and derives the view size for each contact.

When user 101 opens user contact screen 110, processor 115 requests, from application module 125, information about each contact, and returns the information to user contact screen 110 to be presented to user 101.

Contacts having a low level of interaction with user 101 will be represented on user contact screen 110 in a small view size 130. Contacts having a medium level of interaction with user 101 will be represented on user contact screen 110 in a medium view size 135. Contacts having a high level of interaction with user 101 will be represented on user contact screen 110 in a large view size 140.

Table 1, below, shows an example of calculations for scoring.

TABLE 1

Example of Calculations for Scoring

| User Actions | Effect |
| --- | --- |
| Incoming/outgoing 1-1 message from contact X | $M_{1-1} = M_{1-1} + 1$<br>$M_{1-1}[X] = M_{1-1}[X] + 1$ |
| Incoming/outgoing 1-1 call with contact X of t minutes | $V_{1-1} = V_{1-1} + t$<br>$V_{1-1}[X] = V_{1-1}[X] + t$ |
| Incoming/outgoing message in group chat | $M_G = M_G + 1$<br>For each member X of group<br>$M_G[X] = M_G[X] + 1$ |
| Conference call of t minutes | $V_G = V_G + t$<br>For each member X of group<br>$V_G[X] = V_G[X] + t$ | where:
$M_{1-1}$=total number of messages in 1-1 chats.
$M_{1-1}[X]$=total number of messages in 1-1 chat with contact X.
$V_{1-1}$=total minutes of 1-1 voice calls.
$V_{1-1}[X]$=total minutes of 1-1 voice calls with contact X.
$M_G$=total number of messages in group chats.
$M_G[X]$=total number of messages in group chats including contact X.
$V_G$=total minutes of conference voice calls.
$V_G[X]$=total minutes of conference voice calls including X.

The calculation of a contact X score is being done as follows:

$$S[X] = \frac{0.4 * V_{1-1}[X]}{V_{1-1}} + \frac{0.4 * M_{1-1}[X]}{M_{1-1}} + \frac{0.1 * V_G[x]}{V_G} + \frac{0.1 * M_G[x]}{M_G}$$

Background processes will run daily and calculate the score for the previous week. A weekly score for people with whom the user did not talk or exchange messages will be 0. The score will be updated as follows:

$S[\text{New}] = 0.3 * S[\text{week}] + 0.7 * S[\text{Old}]$

Calculating conversation view size depends on graphical language, device screen size and states. Application module 125 distinguishes between two main situations: continuous sizes, and discrete sizes.

In the case of continuous sizes application module 125 defines:
  $R_{Min}$—the minimum radius of contact conversation view size.
  $R_{Max}$—the maximum radius of contact conversation view size.
  Radius of specific contact will be calculated as followed:

$R_{Contact} = R_{Min} + (R_{Max} - R_{Min}) * S_{Contact}^2$

In the case of discrete sizes, we define $S_1 > S_2 \ldots > S_N$ to be the possible sizes, predefined by graphical language per interface screen and mode.

The two contacts with the highest score will be represented in size $S_1$. Similarly, the next $2_i$ contacts, by score order, will be of size $S_i$. Finally, the remaining contacts will be represented in the smallest size—$S_N$.

Table 2, below, shows an example of a determination of view size based on an evaluation of some exemplary communication parameters. In this example, user 101 has 3 contacts: namely contact 1, contact 2, and contact 3. User 101 and contact 1 rarely communicate. User 101 and contact 2 communicate regularly. User 101 and contact 3 communicate extensively.

TABLE 2

Example of a Determination of View Size

| Communication parameters | Contact 1 | Contact 2 | Contact 3 |
| --- | --- | --- | --- |
| total minutes of 1-1 voice calls | 20 | 50 | 100 |
| total minutes of conference voice calls | 0 | 10 | 50 |
| total number of messages in 1-1 chats | 10 | 20 | 50 |
| total number of messages in group chats | 0 | 10 | 20 |
| Score | 12 | 30 | 67 |
| View size (mobile) | Small | Small | Large |
| View size (tablet) | Small | Medium | Large |

In practice, view size depends on the size or type of a displaying device's screen, and a customizable definition of how many view sizes are allowed. In the example shown in Table 2, a mobile device is defined to have two view sizes, i.e., small and large, and a tablet is defined to have three view sizes, i.e., small, medium and large.

Server 180 is invoked by every communication transaction, e.g., call/message. In addition, server 180 is invoked periodically in a batch mode by a scheduler. Server 180 calculates parameters that reflect an intensity of interactions between user 101 and contacts 1, 2 and 3 based on a frequency and/or quantity of interactions between them. Thereafter, server 180 returns these parameters' values to application module 125 over communication network 175.

Application module 125 fetches from memory 120, contacts list calls and messages details, and based on parameter values that it received from server 180, calculates the score from which it derives the contact view sizes for the different contacts.

When user 101 opens user contact screen 110, processor 115 requests, from application module 125, information about each contact, and returns the information to user contact screen 110 to be presented to user 101.

Contacts 1, 2 and 3 will be presented on user contact screen 110, and will have sizes that are commensurate with their relative levels of interaction with user 101.

Figure 2:
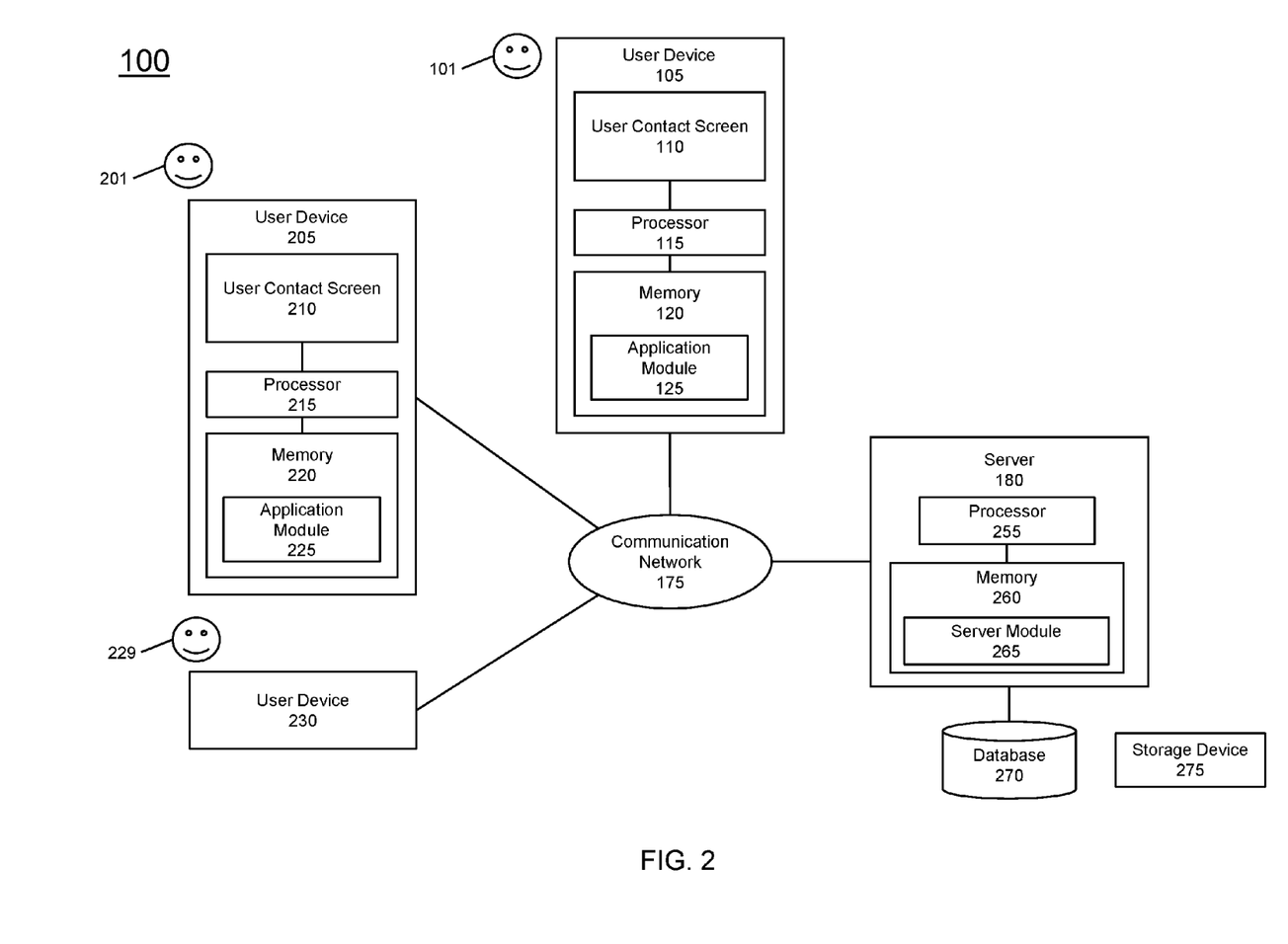
FIG. 2 is another block diagram of the system of FIG. 1, and shows additional details of its architecture, and the architecture of a server.

FIG. 2 is another block diagram of system 100, and shows additional details of its architecture, and the architecture of server 180. Here, system 100 is shown to further include a user device 205 that is used by a user 201, and a user device 230 that is used by a user 229. Users 201 and 229 are contacts of user 101. Thus, system 100 operates in an environment that includes a plurality of devices and a plurality of users. In practice, system 100 may include many more user devices for many more users.

User devices 205 and 230 are configured similarly to user device 105. For example, user device 205 includes a user contact screen 210, a processor 215, a memory 220 and an application module 225 that are similar to those of user device 105.

Server 180 includes a processor 255 and a memory 260.

Processor 255 is an electronic device configured of logic circuitry that responds to and executes instructions.

Memory 260 is a tangible computer-readable storage device encoded with a computer program. In this regard, memory 260 stores data and instructions, i.e., program code, that are readable and executable by processor 255 for controlling the operation of processor 255. Memory 260 may be implemented in a random access memory (RAM), a hard drive, a read only memory (ROM), or a combination thereof. One of the components of memory 260 is a server module 265.

Server module 265 contains instructions for controlling processor 255 to execute the operations described herein. For example, under control of server module 265, processor 255 synchronizes data about communication interactions, e.g., messages/calls, across user devices 105, 205 and 230.

While server module 265 is indicated as being already loaded into memory 260, it may be configured on a storage device 275 for subsequent loading into memory 260. Storage device 275 is a tangible computer-readable storage device that stores server module 265 thereon. Examples of storage device 275 include a compact disk, a magnetic tape, a read only memory, an optical storage medium, a hard drive or a memory unit consisting of multiple parallel hard drives, and a universal serial bus (USB) flash drive. Alternatively, storage device 275 can be a random access memory, or other type of electronic storage device, located on a remote storage system and coupled to server 180 via communication network 175. Storage device 185 and storage device 275 may be implemented as a single storage device that holds both of application module 125 and server module 265.

Although server 180 is represented herein as a standalone device, it is not limited to such, but instead can be coupled to other devices (not shown) in a distributed processing system.

Server 180 is communicatively coupled to a database 270.

Database 270 is an organized collection of data that contains all contacts' data, scores and usage, e.g., calls and messages.

In summary, user device 105 is an apparatus that includes a display, i.e., user contact screen 110, processor 115, and memory 120. Memory 120 contains instructions in application module 125 that are readable by processor 115 to cause processor 115 to perform, for example, actions of:

(a) receiving, from server 180, data that indicates an intensity of interactions between user 101 and each of user 201 and user 229;

(b) calculating a first score for user 201 and a second score for user 229, based on the intensity of interactions;

(c) determining a first size for a first image that represents user 201 based on the first score, and a second size for a second image that represents user 229 based on the second score; and (d) presenting on user contact screen 110, the first image having the first size and the second image having the second size.

Thus, user device 105 presents, on user contact screen 110, contacts having sizes that are based on relative interactions between user 101 and the contacts.

The first score is greater than the second score when the intensity of interactions between user 101 and user 201 is greater than the intensity of interactions between user 101 and user 229, and the first size is greater than the second size when the first score is greater than the second score. The determining operation also considers a characteristic of user device 105, such as its size or type, e.g., mobile device or tablet.

Figure 3:
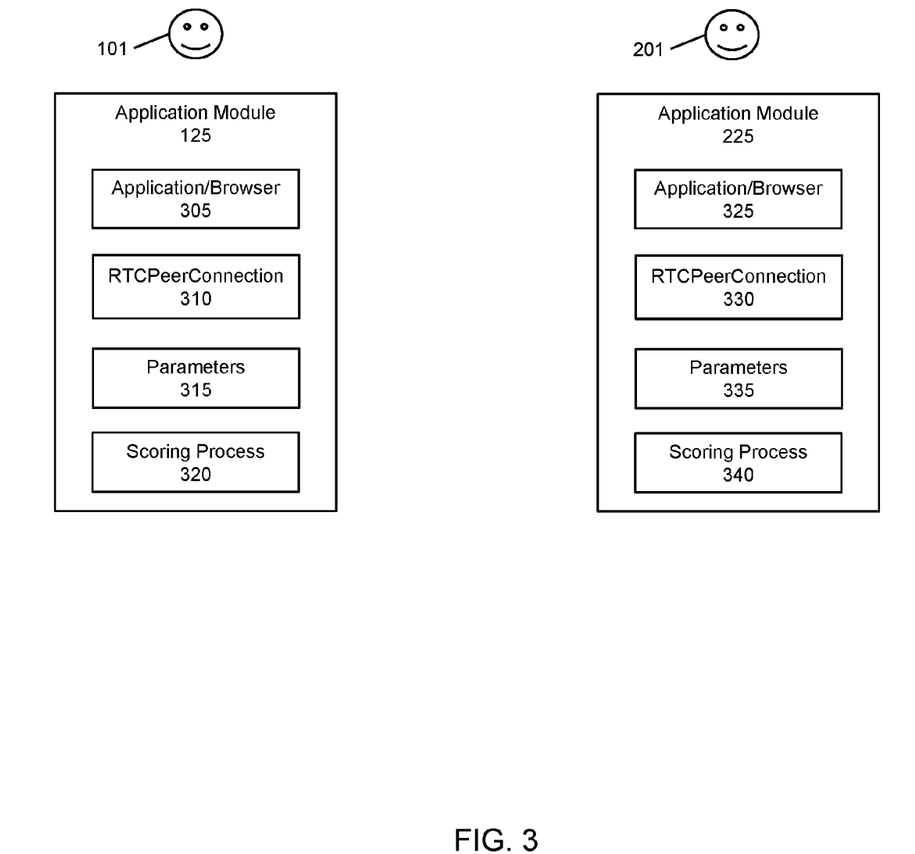
FIG. 3 is a block diagram of application modules that are installed in devices in the system of FIG. 1.

FIG. 3 is a block diagram of application module 125 and application module 225. Recall that application module 125 is a component of user device 105, which is used by user 101, and that application module 225 is a component of user device 205, which is used by user 201.

WebRTC is a free, open project that provides browsers and mobile applications with Real-Time Communications (RTC) capabilities via application program interfaces (APIs). RTCPeerConnection interface represents a WebRTC connection and handles streaming of data between two peers. Basic RTCPeerConnection usage involves negotiating a connection between a local machine and a remote machine by generating Session Description Protocol to exchange data between the two machines.

Application module 125 has an application/browser 305, an RTCPeerConnection 310, parameters 315 and a scoring process 320. Application module 225 has an application/browser 325, an RTCPeerConnection 330, parameters 335 and a scoring process 340.

Application/browsers 305 and 325 are processes for calculating the view sizes of the contacts.

RTCPeerConnections 310 and 330 are processes for performing actual communication functions, e.g., messages/calls.

Parameters 315 and 335 are processes for collecting data about a number of incoming/outgoing messages, and a number of calls and their duration, and to sync with server 180 about data from other devices.

Scoring processes 320 and 340 are processes for calculating the communication scores.

Figure 4:
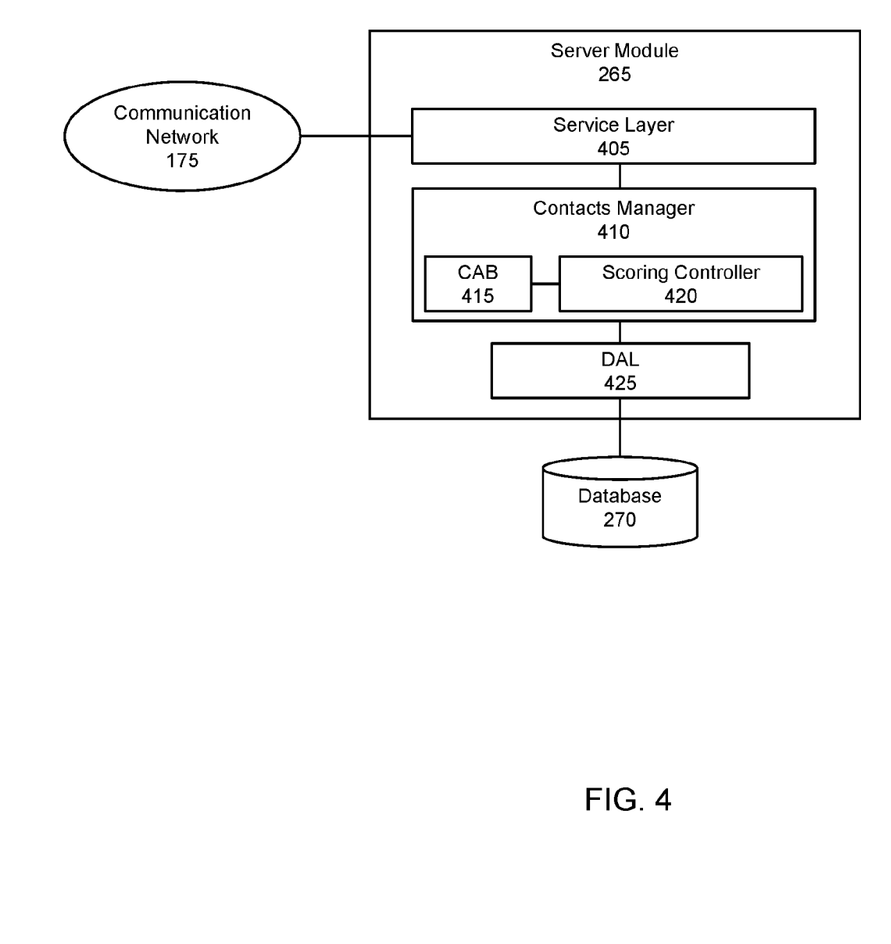
FIG. 4 is a block diagram of a server module.

FIG. 4 is a block diagram of server module 265, showing additional details of its architecture. Server module 265 includes a service layer 405, a contacts manager 410, and a data access layer (DAL) 425.

Service layer 405 is a touch point with communication network 175 containing service descriptions for business capabilities and services such as communication channel management, e.g., calls and messaging, and contacts management, e.g., converged address book coupled with scores.

Contact manager 410 combines a full state of all user's contacts and scores. Contacts manager 410 includes a converged address book (CAB) 415 and a scoring controller 420. CAB 415 manages a multi-device contacts list. Scoring controller 420 monitors and controls a user's multi-device activities and syncs all devices with the most updated scoring values.

DAL 425 provides simplified access to data stored in database 270.

Figure 5:
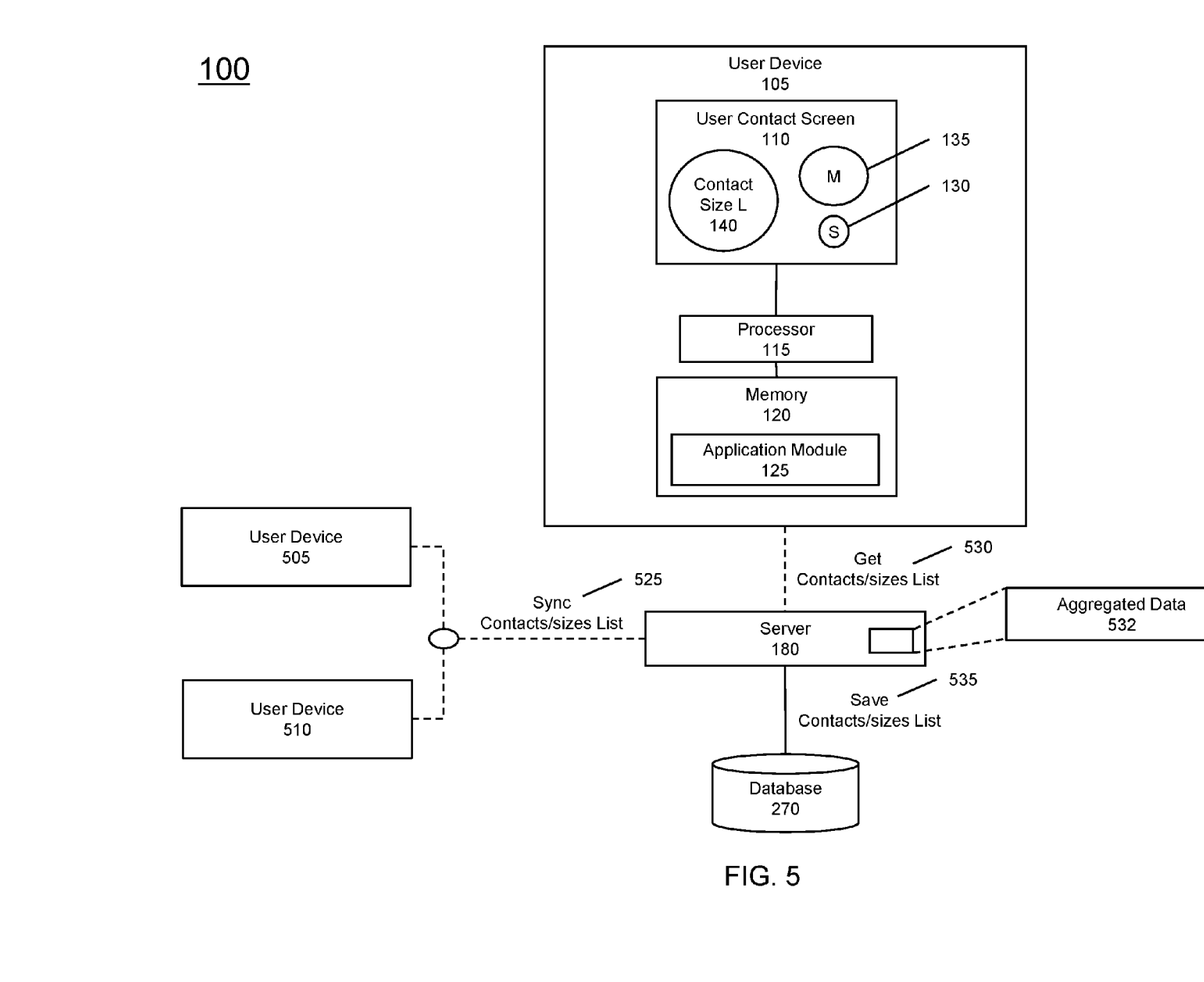
FIG. 5 is another block diagram of the system of FIG. 1, and shows some processes being conducted between its components.

FIG. 5 is another block diagram of system 100, and shows some processes being conducted between its components. FIG. 5 introduces a scenario in which user 101 is currently using user device 105, but also has other user devices 505 and 510 in addition to user device 105. Server 180 employs a synchronization process 525 that aggregates details of interactions with contacts and groups over all user devices (in other words: devices 105, 505 and 510 all belong to the same user), thus producing aggregated data 532. Thereafter, in a process 530, user device 105 obtains aggregated data 532 from server 180. In a process 535, server 180 saves aggregated data 532 to database 270.

Figure 6:
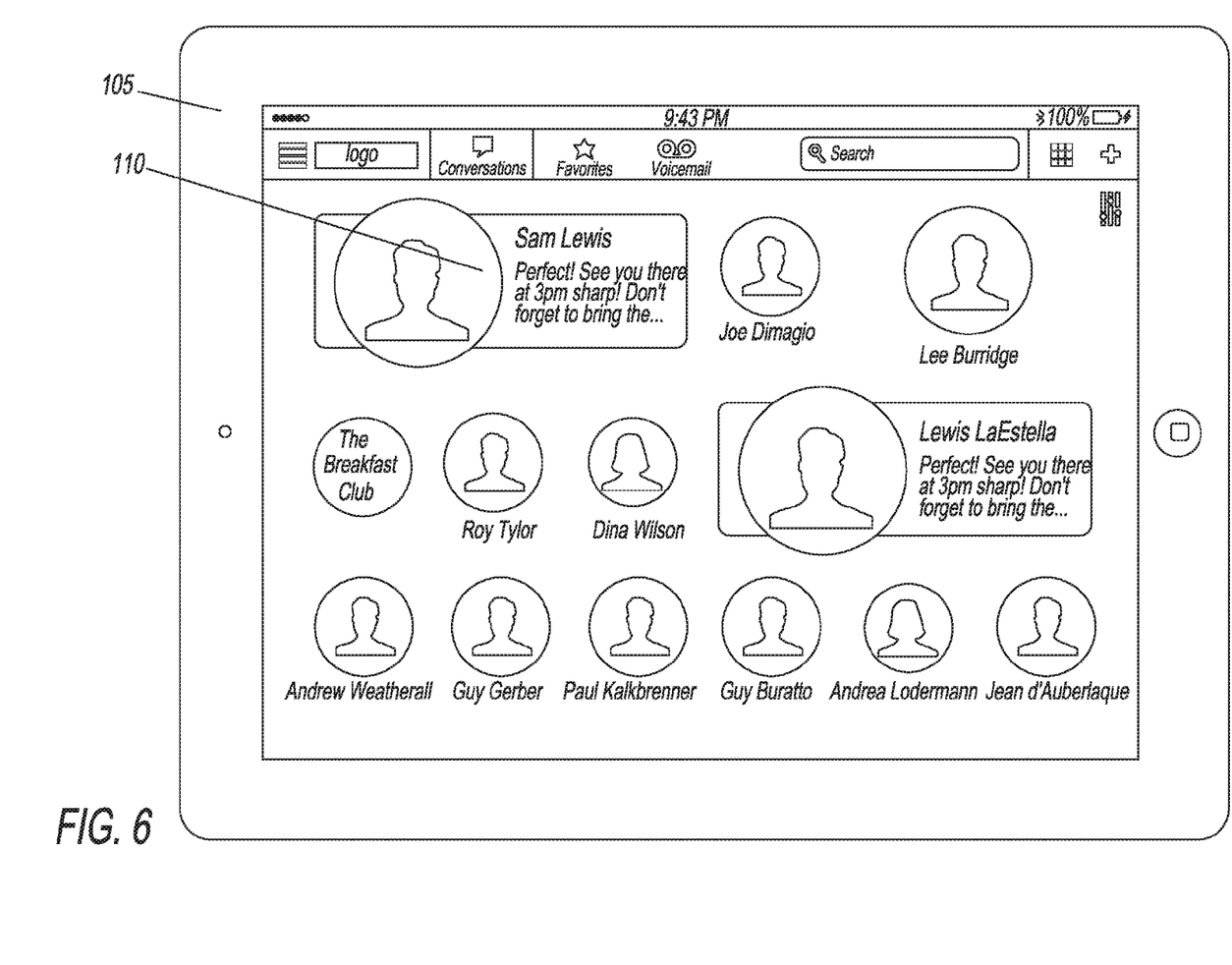
FIG. 6 is an example of an implementation of a user device being a tablet.

FIG. 6 is an example of an implementation of user device 105 being a tablet. As shown in FIG. 6, user device 105 may present more than two contacts, with various sizes, on user contact screen 110.

Technical benefits of system 100 include:
(a) Being modular, flexible, and adjustable to specific needs. New media channels, such as social media, mails etc., can be easily aggregated into scoring. Can be adjusted to be time/location oriented and consider these parameters as well.
(b) Derivation of interface size is generic and can be adapted to different screen size and graphic preferences.

The techniques described herein are exemplary, and should not be construed as implying any particular limitation on the present disclosure. It should be understood that various alternatives, combinations and modifications could be devised by those skilled in the art. For example, steps associated with the processes described herein can be performed in any order, unless otherwise specified or dictated by the steps themselves. The present disclosure is intended to embrace all such alternatives, modifications and variances that fall within the scope of the appended claims.

The terms "comprises" or "comprising" are to be interpreted as specifying the presence of the stated features, integers, steps or components, but not precluding the presence of one or more other features, integers, steps or components or groups thereof. The terms "a" and "an" are indefinite articles, and as such, do not preclude embodiments having pluralities of articles.

What is claimed is:

1. A method comprising: receiving, by a processor, from a server, data that indicates an intensity of interactions between a user and each of a first contact of said user and a second contact of said user, wherein said interactions include (i) communications conducted by way of a first device of said user, and (ii) communications conducted by way of a second device of said user;
calculating, by said processor, a first score for said first contact and a second score for said second contact, based on said intensity of interactions;
determining, by said processor, a first size for a first image that represents said first contact based on said first score, and a second size for a second image that represents said second contact based on said second score; and presenting, said processor, on a display, said first image having said first size and said second image having said second size.

2. The method of claim 1, wherein said interactions comprise an interaction selected from the group consisting of a number of voice calls, a length of a voice call, a number of text messages, a total minutes of one-on-one (1-1) voice calls, a total minutes of conference voice calls, a total number of messages in 1-1 chats, a total number of messages in group chats.

3. The method of claim 1, wherein said first score is greater than said second score when said intensity of interactions between said user and said first contact is greater than said intensity of interactions between said user and said second contact.

4. The method of claim 3, wherein said first size is greater than said second size when said first score is greater than said second score.

5. The method of claim 1, wherein said display is a component of a device, and wherein said determining considers a characteristic of said device.

6. An apparatus comprising: a display; a processor; and a non-transitory memory that contains instructions that are readable by said processor to cause said processor to perform actions of: receiving, from a server, data that indicates an intensity of interactions between a user and each of a first contact of said user and a second contact of said user, wherein said interactions include (i) communications conducted by way of a first device of said user, and (ii) communications conducted by way of a second device of said user;
calculating a first score for said first contact and a second score for said second contact, based on said intensity of interactions; determining a first size for a first image that represents said first contact based on said first score, and a second size for a second image that represents said second contact based on said second score; and presenting on said display, said first image having said first size and said second image having said second size.

7. The apparatus of claim 6, wherein said interactions comprise an interaction selected from the group consisting of a number of voice calls, a length of a voice call, a number of text messages, a total minutes of one-on-one (1-1) voice calls, a total minutes of conference voice calls, a total number of messages in 1-1 chats, a total number of messages in group chats.

8. The apparatus of claim 6, wherein said first score is greater than said second score when said intensity of interactions between said user and said first contact is greater than said intensity of interactions between said user and said second contact.

9. The apparatus of claim 8, wherein said first size is greater than said second size when said first score is greater than said second score.

10. The apparatus of claim 6, wherein said determining considers a characteristic of said apparatus.

11. A non-transitory storage device comprising instructions that are readable by a processor to cause said processor to perform actions of: receiving, from a server, data that indicates an intensity of interactions between a user and each of a first contact of said user and a second contact of said user, wherein said interactions include (i) communications conducted by way of a first device of said user, and (ii) communications conducted by way of a second device of said user; calculating a first score for said first contact and a second score for said second contact, based on said intensity of interactions;

determining a first size for a first image that represents said first contact based on said first score, and a second size for a second image that represents said second contact based on said second score; and presenting on a display, said first image having said first size and said second image having said second size.

12. The non-transitory storage device of claim 11, wherein said interactions comprise an interaction selected from the group consisting of a number of voice calls, a length of a voice call, a number of text messages, a total minutes of one-on-one (1-1) voice calls, a total minutes of conference voice calls, a total number of messages in 1-1 chats, a total number of messages in group chats.

13. The non-transitory storage device of claim 11, wherein said first score is greater than said second score when said intensity of interactions between said user and said first contact is greater than said intensity of interactions between said user and said second contact.

14. The non-transitory storage device of claim 13, wherein said first size is greater than said second size when said first score is greater than said second score.

15. The non-transitory storage device of claim 11, wherein said display is a component of a device, and wherein said determining considers a characteristic of said device.

* * * * *